Figure 2:
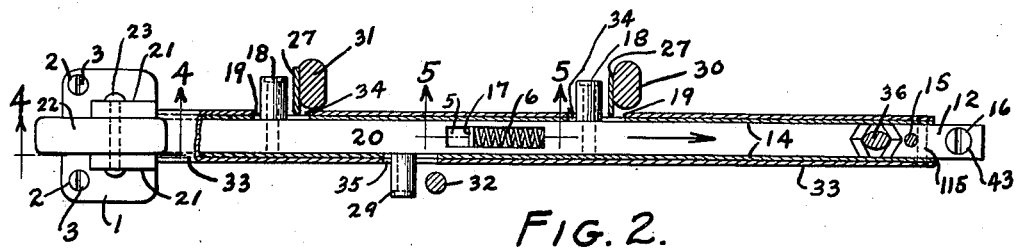

June 15, 1937.  A. J. ABEL  2,083,974

ACCELERATOR CONTROL

Filed May 18, 1936

Inventor
ALF. J. ABEL.
By Howard J. Whelan.
Attorney

Patented June 15, 1937

2,083,974

UNITED STATES PATENT OFFICE 2,083,974

ACCELERATOR CONTROL

Alf J. Abel, Miami, Fla.

Application May 18, 1936, Serial No. 80,460

5 Claims. (Cl. 192—.01)

This invention refers to devices for mechanically controlling the operation of the accelerator pedal on a motor vehicle and particularly a type for operating in conjunction with the brakes and clutch, etc. of the vehicle. It has among its objects to provide for an automatic operation of the accelerator pedal in conjunction with the brake or clutch pedal mechanism, proportional to the pedal action; to have a quick release for detaching the device out of operation and enabling the accelerator to be operated normally; to have it adaptable for use with the brake, clutch, and starter pedals collectively or individually; to have the construction simple and without projecting or obstructing parts that might interfere with the movement of the operator's foot, his clothes and his convenience, or detract from the appearance of the vehicle in any way; and to have it arranged for facile installation, removal or inspection. Other objects will become apparent as the invention is more fully set forth.

Devices of this nature are usually built up in a complicated manner that provides for many links, cords, pulleys and other moving parts tending to bring about a somewhat tardy movement as well as increase the possibilities of inoperation and breakage. This device is relatively simple with only one main moving part, which is primarily used to clamp and hold the accelerator in any of the positions of its travel, that it acts on. The brake or clutch pedal mechanism serves to detach the accelerator pedal mechanism and allow same to return to a "slowing" position, and work in harmony with the brake or clutch action. When the starter pedal is used, it actuates the device so that the accelerator may be caused to feed automatically according to the movement that the operator gives it, avoiding the usual use of the throttle when the starter is used.

Figure 1:
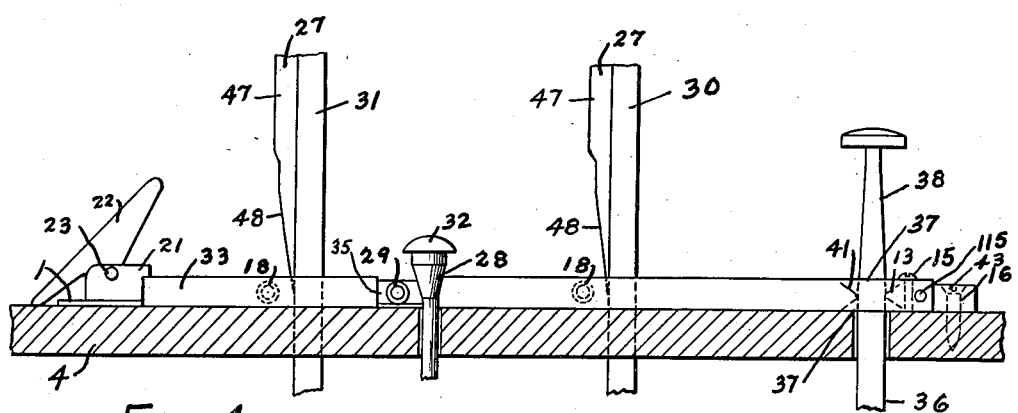
Figures 3, 4, 5:
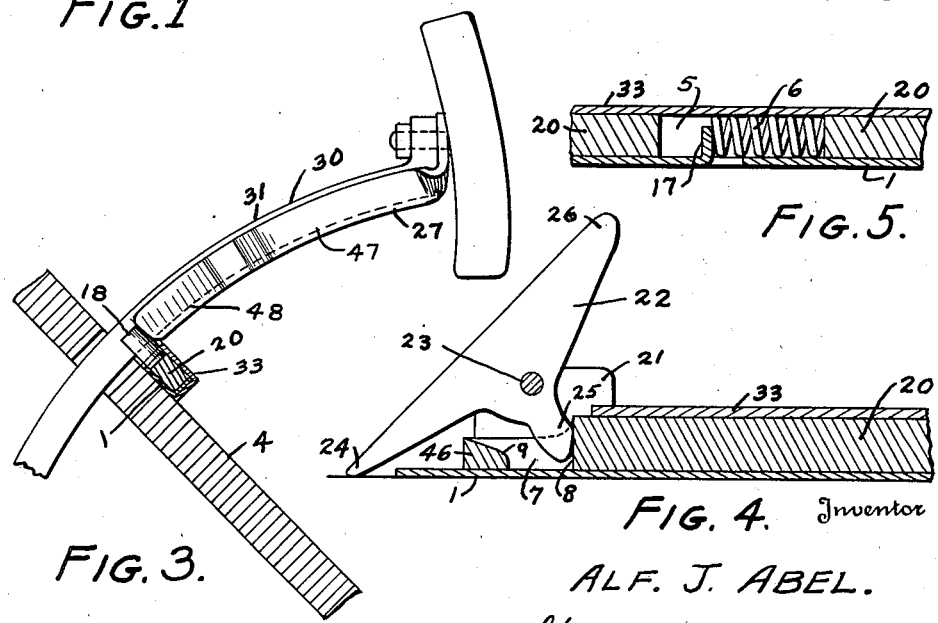

In the drawing is shown a modification of a device embodying this invention, in which:

Figure 1 is a side elevation of an accelerator control shown attached to the floor board of an automobile, Figure 2 is a plan view of Figure 1 partly in section to show the interior construction of the device, Figure 3 is a detail of the device part that connects with a brake or clutch pedal of an automobile, Figure 4 is a sectional detail along the lines 4—4 of Figure 2, showing the position lock, and Figure 5 is a detail along the line 5—5 of Figure 2 indicating the operating spring connections.

Similar reference characters refer to similar parts throughout the drawing.

The device in general in the construction shown is provided with a foundation channel 1 having holes 2 in it for bolts or screws 3 to attach it to the floor board 4 of a motor vehicle. A central slot 5 is provided as shown in a central body piece 20 to receive a spring 6; its rear end portion 46 has a slot 7 with one face 8 flat and upright and its opposite face 9 bevelled and rounded, as indicated. The front-end portion of the piece is bevelled and converges to form a jaw 41 for clamping on the accelerator pedal stem 38 which passes through the same, and the member 12 symmetrically opposed to it with its jaws 13 is for the same purpose. The central body 20 and the member 12 are mounted in the foundation channel 1, the former to slide or travel a short distance within it, in a reciprocating manner, being guided by the sides 14 of the channel, while the member 12 is tightly secured in the channel 1 with the screws 15 and pin 115. It has a hole 16 to permit the screw 43 to pass through it.

The channel is provided with a piece 17 arranged to coact with the slot 5 and form a limiting stop or base for the spring 6 which is arranged to press the central body 20 in the direction of the arrow seen in Figure 2. The central body is provided with contactors 18 which project out from the side of the foundation channel, which is cut out at 19 for the purpose. This arrangement allows the contactors to move with the travel of the central body, without obstruction. The channel is arranged with a journal piece 21 located close to the slot 7 to permit a travel lock 22 to operate in conjunction with both. The travel lock has a shaft 23 in it which journals in the member 21 and rotates through an arc in same. The lock has three arms, 24, 25 and 26 respectively, which act as follows. The arm 24 serves as a rest when the central body is operating in a clamping position and limits the arcuate travel of the lock in one direction. The arm 25 rests against the central body 20 when in operating position.

This arm also coacts with face 9 of the central body 20 when the operator presses the arm 26 towards the channel, and at the end of its travel locks the body member in open jaw position, counteracting spring 6.

The brake pedal arm 30 comes close to one of the contactors 18 corresponding to its location, as also does the clutch pedal arm 31. The arms 30 and 31 are equipped with bevelled members 27 which are a part of this device and which serve during braking or clutch pedal movement, to gradually push the contactors 18 and thereby the central body 20, whereby the latter is caused to travel against the spring pressure, or towards the travel lock. A starter button 32 is also provided with a tapered sleeve 28 which is so formed as to engage against a contactor 29 and force it gradually away as it is pressed down, and incidently make the central body travel. A channel casing 33 is mounted over the channel 1, within which is the central body 20. It has slots 34 for the contactors 18 to travel in, as well as a slot 35 for the contactor 29. A hole 37 is punched in the casing for the stem 36 of the accelerator to pass through, which stem is tapered 38, as indicated as a part of this device and preferably as a sleeve covering the stem and connected rigidly to it. The modifications to the clutch arm, brake arm, accelerator stem and starter stem, are indicated in the simplest manner in the drawing, by preferably mounting same directly on these parts, and this application is intended to fully comprehend any equivalent construction.

In the operation of the device, assuming it is properly mounted on a conventional form of motor vehicle, and the latter is provided with pedals and arms for an accelerator, brake, clutch and starter. The relative position of the parts is generally as indicated in Figure 1. The accelerator stem is placed in the portion of the channels, central body and member as indicated. The jaws 41 of the central body 20 and those 13 of the member 12 close towards each other and their bevelled edges serve to clamp around the stem of the accelerator, under the action of spring 6 which causes the central body with its jaws 41 to move towards the stationary jaws 13. This clamping action will retain the accelerator stem in any position of its travel when under the full action of the spring. However, by pressing the arm 26 so that it rests on the channel casing and its arm 25 pressing against the face 9, the central body 20 is forced back against the action of the spring to the position that leaves the jaws 41 and 13 wide apart, releasing the stem of the accelerator. The travel lock 22 being journalled off-center, is brought to a locked position when so placed.

In this position the device is free from controlling the accelerator, clutch, brake and starter and will stay so indefinitely. However, by raising the arm 26 with the foot, so that it is in the position indicated in Figure 4, the travel lock is released and the spring forces the jaws together. When the brake or clutch is forced down, it causes the bevelled member 27 (in either case) to press against the contactor 18 and thereby force the central body to travel back towards the travel lock end of the device, and in proportion to the amount pressed down and the amount of bevel edge put into action. Thus, if the pedal is only forced down a little, it will only open the jaws a little and allow the stem of the accelerator to rise slowly and to a certain point due to the taper of the stem; as it is assumed that it has been forced down first, to an operating position, close to the floor board. This action will release the amount of fuel used by the motor and slow it up as the brakes are used. In operating the starter, the accelerator is forced down first to full feed position. Then the starter button is pressed and immediately the motor is started. If the button is pressed down more, it will still continue to turn the motor over and because of its bevel or wedge form, will spread the jaws apart to permit the stem to rise slightly and thereby cut down the fuel to the motor, to any desired amount, determined by the operator. This feature enables the starter to turn over the engine while giving it full accelerator opening and full rich charge of fuel mixtures at the beginning, and then cut down the feed gradually as the starter is pushed in further and turns the engine longer. Thus it acts to give more "gas" when the engine needs it most, and to cut it off gradually as it needs it less, and in proportion. Lifting the pedal arms of any of these parts will allow the jaws to grip tighter and hold the accelerator at any position selected. The slots in the sides of the channels limit the movement of the central body in its reciprocating travel because of the control over the contactors. When the clutch or brake pedal mechanism is pushed down sufficiently to bring the upper or wide portion 47 (above the bevel face 48) into contact with the contactor 18, it will move the latter and the central body member to the end of its open-jaw position, and at the same time act on the arm 25 to rotate the locking member 22 until the arm 26 falls over by its weight on the channel casing 33. This will result in an action similar to that of an operator actuating the locking member, or travel lock, by pressing his foot on the arm 26 for the same purpose. In either case the jaws will open and allow the accelerator stem to rise and shut off the fuel to the engine, or be operated in any normal manner.

It should be noted that the travel lock, when positioned and resting on the channel casing, aligns the lock and its shaft so that the pressure from the surface 9 against the arm 24 will not rotate the lock 22 but will hold itself locked down, the pressure causes the tension of the spring 6 to hold it more securely.

The device enables the user to adjust the accelerator to any desired fuel feed, and his operation of the clutch or brake automatically releases it and reduces the speed of the motor to ordinary running speed. This feature keeps the motor running more uniformly and the riding more comfortable. It relieves the operator of the constant tension of having his foot on the accelerator and gives him more personal freedom. In the operation of the starter, the use of the hand choke can be eliminated and an adjustment made with the foot, to suit the more desirable range of speeds suited to the better operation of the engine or motor. The ease with which the lock can be operated serves to add to the convenience of the device. The device, being in a neat narrow single strip can be installed inconspicuously on the floor of the vehicle and out of the way, and being close to the floor, will not form an obstruction, which has been an objection in other devices. The number of contactors can be varied to suit any desired condition and enable the operator to provide for any desired selection in this way, that will suit him, because the removal of the contactor can be made relatively easy. The parts are covered by the casing and therefore not subject to the collection of dirt and lint, while the operating mechanism is so simple as to provide little opportunity for anything getting out of order.

While but one form of the invention is shown in the drawing, it is not desired to limit this application for patent to this particular form, or in any other way, otherwise than limited by the prior art, as it is appreciated that other forms of construction could be used that would use the same principles and come within the scope of the appended claims.

Having thus described the invention, what is claimed is:

1. In a motor vehicle, the combination of an accelerator control comprising, a body member adapted to travel in close registry with the brake, clutch, starter and accelerator arms and with portions adapted to contact the same, jaws on said body for frictionally controlling the movement of the accelerator arm from open to closed position adjustably, means coacting with the starter arm and member portion for moving the accelerator arm proportionately to its travel, and means coacting between the said arms and their respective member portions for actuating the said body member independently of each other and to cooperate with the operative function of each of said arms respectively.

2. In combination with a motor vehicle, an accelerator control comprising a reciprocating body member adapted to travel in close registry with the brake, clutch, starter and accelerator mechanism of the vehicle and with portions adapted to contact same respectively at predetermined sections of its or their travel, means coacting the starter and its respective portions together for adjusting the position of the accelerator mechanism proportionately to the relative position of the starter mechanism, and means coacting between the brake and clutch mechanism and their respective portions for operating the member out of control of the accelerator mechanism.

3. A device for controlling the accelerator pedal mechanism of a motor vehicle comprising in combination, a central body member having a plurality of jaws for frictionally engaging and adjustably holding the accelerator of the vehicle, a resilient element for tensioning the said member in such engagement, a plurality of pedal attachments for automatically and adjustably controlling the movement of the member and its position of engagement of the accelerator and means for attaching the central body member and attachments to the vehicle.

4. A device for controlling the accelerator mechanism of a motor vehicle comprising in combination, a central body member having jaw means for frictionally locking the accelerator of the vehicle, a channel casing for guiding and holding said body member, a spring for tensioning said body member in the casing towards the accelerator and its frictional engagement therewith, pedal attachments for automatically and adjustably propelling the said body member and controlling the opening of the jaws and the position of the accelerator therewith, and means for connecting the casing and attachments to the vehicle.

5. A device for controlling the accelerator mechanism of a motor vehicle comprising in combination, a central body member having jaw means for frictionally and adjustably locking the accelerator of the vehicle, a channel casing for guiding and holding said body member, a spring for tensioning said body member in the casing towards the accelerator and its frictional engagement therewith, pedal attachments for automatically and adjustably propelling the said body member and controlling the opening of the jaws and the position of the accelerator therewith, means for connecting the casing and attachments to the vehicle, and a travel lock for enabling the body member to be positioned out of engagement with the said attachments and accelerator, and variable body means on the accelerator for cooperatively assisting the jaws in adjustably positioning the same.

ALF J. ABEL.